(No Model.)
H. R. HAGE.
HOOF TRIMMER.
No. 389,463. Patented Sept. 11, 1888.
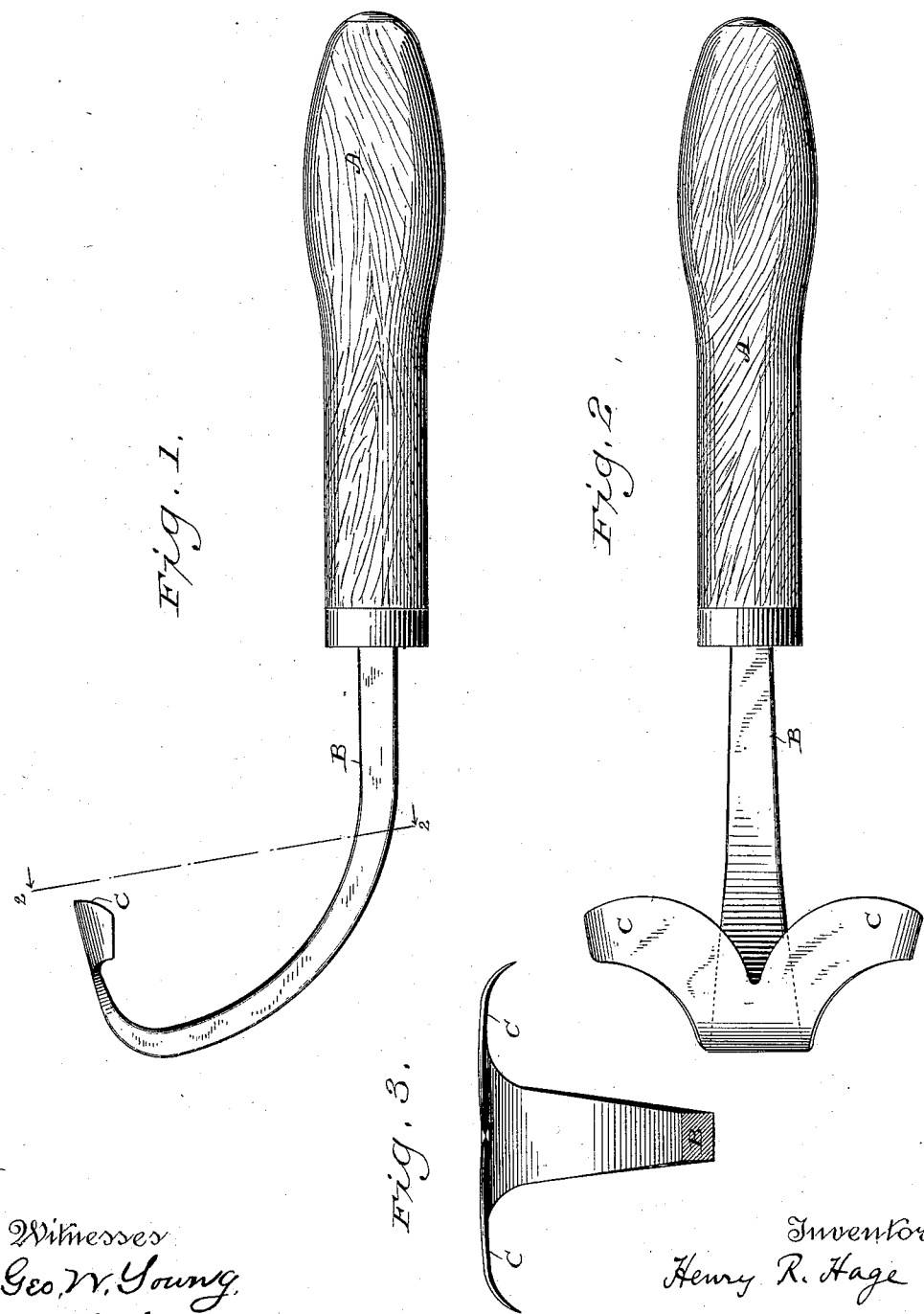
Witnesses
Geo. W. Young.
N. E. Oliphant
Inventor
Henry R. Hage
By Stout & Underwood
Attorneys

UNITED STATES PATENT OFFICE.

HENRY R. HAGE, OF PLANKINTON, ASSIGNOR OF ONE-HALF TO JOSEPH HAGE, OF AURORA COUNTY, DAKOTA TERRITORY.

HOOF-TRIMMER.

SPECIFICATION forming part of Letters Patent No. 389,463, dated September 11, 1888.

Application filed April 6, 1888. Serial No. 269,791. (No model.)

*To all whom it may concern:*

Be it known that I, HENRY R. HAGE, of Plankinton, in the county of Aurora and in the Territory of Dakota, have invented certain new and useful Improvements in Hoof-Trimmers; and I do hereby declare that the following is a full, clear, and exact description thereof.

My invention relates to hoof-trimmers; and it consists in certain peculiarities of construction, to be hereinafter described with reference to the accompanying drawings and subsequently claimed.

In the drawings, Figure 1 represents a side elevation of a hoof-trimmer constructed according to my invention; Fig. 2, a rear elevation of the same; and Fig. 3, a section taken on line 2 2, Fig. 1.

Referring by letter to the drawings, A represents the handle of my hoof-trimmer; B, a curved shank that is fastened in said handle by any suitable means, and C C lateral blades that extend in opposite directions from the lower end of the shank. The blades are preferably made by splitting and forging the lower end of the shank into the desired shape, after which operation the parts are tempered and said blades ground to an edge; but it is obvious that the shank and blades may be cast in one piece or made separate, to be united by welding or other suitable means.

As shown by the drawings, the lateral oppositely-extended blades C C are curved and turned in at their outer ends, the curve serving to facilitate the trimming of a hoof-crust and the turned-in ends of said blades are for the purpose of trimming in between the bars and heels of a hoof, and also serve as guards to prevent injury to the frog when the tool is being used to trim inside said crust. The blade nearest the operator—that is, the blade which projects toward the operator when he grasps the handle—is employed for trimming the crust and between the bars and heel of a hoof, and while either blade may be employed to trim the edges and sides of said hoof the one farthest from the operator will be the most convenient.

By means of the oppositely-extended lateral blades C C the tool may be used in either direction; or, in other words, in a direction to or from the operator, as may best suit his convenience, this being an impossibility with hoof-trimmers of the ordinary construction.

Another advantage of my invention lies in the fact that I can obtain a greater purchase of the tool on a hoof and consequently increase the power, thus enabling me to successfully trim hard hoofs without having to resort to any burning or other means for softening the same, as is the case when the ordinary trimming tools are employed, because of the lack of purchase and consequent increase of power necessary to cut the hard substance.

As it is a well-known fact that hoofs are injured by the employment of means to soften the same, the advantages derived from a tool similar to the one above described will be obvious.

Having thus fully described my invention, what I claim as new, and desire to secure by Letters Patent, is—

A hoof-trimmer consisting of a curved shank having its lower end curved back toward the handle and notched and turned out in opposite directions, forming the inwardly and upwardly curved blades C C, said blades pointing back toward the handle in continuation of the curve of the shank, as shown and described.

In testimony that I claim the foregoing I have hereunto set my hand, at Milwaukee, in the county of Milwaukee and State of Wisconsin, in the presence of two witnesses.

HENRY R. HAGE.

Witnesses:
 N. E. OLIPHANT,
 WM. KLUG.